United States Patent
Bardeau et al.

(10) Patent No.: US 12,181,415 B2
(45) Date of Patent: Dec. 31, 2024

(54) METHOD FOR THE QUICK IDENTIFICATION OF MICROORGANISMS BY ANALYSIS OF EXCITATION-EMISSION MATRICES

(71) Applicants: UNIVERSITE DU MANS, Le Mans (FR); CENTRE NATIONAL DE LA RECHERCHE SCIENTIFIQUE-CNRS-, Paris (FR); UNIVERSITE D'ANGERS, Angers (FR); CENTRE HOSPITALIER UNIVERSITAIRE D'ANGERS, Angers (FR)

(72) Inventors: Jean-François Bardeau, Le Mans (FR); Jean-Philippe Bouchara, Corne (FR)

(73) Assignees: UNIVERSITE DU MANS, Le Mans (FR); CENTRE NATIONAL DE LA RECHERCHE SCIENTIFIQUE-CNRS-, Paris (FR); CENTRE HOSPITALIER UNIVERSITAIRE D'ANGERS, Angers (FR); UNIVERSITE D'ANGERS, Angers (FR)

( * ) Notice: Subject to any disclaimer, the term of this patent is extended or adjusted under 35 U.S.C. 154(b) by 275 days.

(21) Appl. No.: 17/780,647

(22) PCT Filed: Nov. 27, 2020

(86) PCT No.: PCT/FR2020/052216
§ 371 (c)(1),
(2) Date: May 27, 2022

(87) PCT Pub. No.: WO2021/105640
PCT Pub. Date: Jun. 3, 2021

(65) Prior Publication Data
US 2023/0003652 A1    Jan. 5, 2023

(30) Foreign Application Priority Data

Nov. 29, 2019 (FR) .................................... 1913480

(51) Int. Cl.
*G01N 21/64* (2006.01)

(52) U.S. Cl.
CPC . *G01N 21/6486* (2013.01); *G01N 2021/6419* (2013.01); *G01N 2021/6421* (2013.01)

(58) Field of Classification Search
CPC ....... G01N 21/6486; G01N 2021/6419; G01N 2021/6421
See application file for complete search history.

(56) References Cited

U.S. PATENT DOCUMENTS

| 3,449,571 A | * | 6/1969 | Hoerman | G01N 21/6486 250/252.1 |
| 3,470,373 A | * | 9/1969 | Brewer | G01N 21/6486 435/808 |

(Continued)

OTHER PUBLICATIONS

Burgas, L. et al., "N-dimensional extension of unfold-PCA for granular systems monitoring", Engineering Applications of Artificial Intelligence, vol. 71, pp. 113-124 (Year: 2018).*

(Continued)

*Primary Examiner* — Blake C Riddick
(74) *Attorney, Agent, or Firm* — Maier & Maier, PLLC

(57) ABSTRACT

A method for identifying a microorganism to be identified, which includes the following steps: obtaining an Excitation-Emission EEM of the microorganism to be identified, analysing the main components of the EEM matrix using at least one reference EEMr matrix, projecting the result of the analysis onto a plane defined by two main components, and identifying the microorganism to be identified.

10 Claims, 3 Drawing Sheets

(56) References Cited

U.S. PATENT DOCUMENTS

| | | | |
|---|---|---|---|
| 4,521,512 A * | 6/1985 | Silman | C12Q 1/16 436/63 |
| 4,753,878 A * | 6/1988 | Silman | C12Q 1/04 435/35 |
| 4,847,198 A * | 7/1989 | Nelson | C12Q 1/04 436/63 |
| 5,164,301 A * | 11/1992 | Thompson | C12Q 1/04 250/461.1 |
| 5,164,597 A * | 11/1992 | Lodder | C12M 41/36 356/236 |
| 5,187,368 A * | 2/1993 | Galante | C12M 41/36 435/31 |
| 5,866,430 A * | 2/1999 | Grow | G01N 35/00009 436/172 |
| 6,040,191 A * | 3/2000 | Grow | G01N 35/00009 436/172 |
| 6,738,502 B1 * | 5/2004 | Coleman | G01N 21/274 382/167 |
| 7,211,377 B1 * | 5/2007 | Powers | C12Q 1/04 435/4 |
| 8,647,835 B2 * | 2/2014 | Walsh | G01N 21/3563 435/29 |
| 8,652,800 B2 * | 2/2014 | Walsh | G01N 33/6848 435/29 |
| 9,790,534 B2 * | 10/2017 | Walsh | C12Q 1/04 |
| 10,059,975 B2 * | 8/2018 | Walsh | C12Q 1/04 |
| 10,718,012 B2 * | 7/2020 | Ying | C12Q 1/6825 |
| 11,255,783 B2 * | 2/2022 | Fairey | G01N 21/64 |
| 2002/0127546 A1 | 9/2002 | Anderson | B01L 3/5021 435/5 |
| 2002/0138210 A1 * | 9/2002 | Wilkes | G01N 33/6851 702/28 |
| 2002/0147317 A1 * | 10/2002 | Bentsen | C12Q 1/34 548/215 |
| 2002/0158211 A1 * | 10/2002 | Gillispie | G01J 3/4406 250/458.1 |
| 2003/0097059 A1 * | 5/2003 | Sorrell | G01R 33/4625 600/420 |
| 2004/0171137 A1 * | 9/2004 | Powers | G01N 21/6486 435/283.1 |
| 2004/0234952 A1 * | 11/2004 | Kallow | C12Q 1/04 435/5 |
| 2005/0012041 A1 * | 1/2005 | Garcia-Caurel | G01N 21/211 250/339.01 |
| 2005/0019842 A1 * | 1/2005 | Prober | G01N 33/54346 435/7.9 |
| 2005/0061967 A1 * | 3/2005 | Shvartsburg | H01J 49/04 250/288 |
| 2005/0123917 A1 * | 6/2005 | Labischinski | C12Q 1/18 435/6.1 |
| 2005/0185178 A1 * | 8/2005 | Gardner, Jr. | G01N 21/65 356/301 |
| 2005/0202518 A1 * | 9/2005 | Vedrine | C12Q 1/04 435/7.32 |
| 2006/0028644 A1 * | 2/2006 | Gardner, Jr. | G01N 21/6458 356/301 |
| 2006/0152721 A1 * | 7/2006 | Korkeamaki | G01N 15/147 356/318 |
| 2006/0172371 A1 * | 8/2006 | Jelinek | C12Q 1/045 435/34 |
| 2006/0177891 A1 * | 8/2006 | Kishen | G01N 21/7703 435/287.1 |
| 2007/0037135 A1 * | 2/2007 | Barnes | G01N 21/51 356/73 |
| 2007/0064228 A1 * | 3/2007 | Tartakovsky | G01J 3/4406 250/461.1 |
| 2007/0111225 A1 * | 5/2007 | Lambert | G01N 21/6428 435/7.1 |
| 2007/0175278 A1 * | 8/2007 | Puppels | G01N 21/65 435/38 |
| 2007/0269814 A1 * | 11/2007 | Wilkes | G01N 33/54326 435/6.16 |
| 2007/0279629 A1 * | 12/2007 | Grun | G01N 21/65 356/318 |
| 2008/0003610 A1 * | 1/2008 | Frank | C12Q 1/06 435/6.13 |
| 2008/0032420 A1 * | 2/2008 | Lambert | G01N 33/54373 436/514 |
| 2008/0132418 A1 * | 6/2008 | Ismail | G16B 20/00 506/6 |
| 2008/0192246 A1 * | 8/2008 | Neiss | G01J 3/02 356/73 |
| 2008/0194969 A1 * | 8/2008 | Werahera | A61B 5/7267 706/20 |
| 2009/0033930 A1 * | 2/2009 | Maier | G01J 3/44 356/301 |
| 2009/0086205 A1 * | 4/2009 | Grun | G01N 21/65 356/318 |
| 2009/0115996 A1 * | 5/2009 | Serebrennikova | G01N 21/474 356/326 |
| 2009/0163369 A1 * | 6/2009 | Treado | G16B 50/00 506/8 |
| 2009/0197298 A1 * | 8/2009 | Rambach | C12Q 1/04 435/288.7 |
| 2009/0306932 A1 * | 12/2009 | Li | G01N 21/64 702/179 |
| 2009/0325220 A1 * | 12/2009 | Reed | G01N 21/645 435/31 |
| 2010/0055721 A1 * | 3/2010 | Lambert | G01N 33/588 436/514 |
| 2010/0068755 A1 * | 3/2010 | Walsh | C12Q 1/10 435/288.7 |
| 2010/0075409 A1 * | 3/2010 | Waiche | G01N 21/6447 435/288.7 |
| 2010/0124763 A1 * | 5/2010 | Walsh | G01N 33/6848 435/34 |
| 2010/0129857 A1 * | 5/2010 | Walsh | G01N 21/65 435/243 |
| 2010/0129858 A1 * | 5/2010 | Walsh | G01N 33/6848 435/34 |
| 2010/0136609 A1 * | 6/2010 | Clay | G01N 21/65 435/29 |
| 2010/0248298 A1 * | 9/2010 | Kostrzewa | C12Q 1/04 435/34 |
| 2010/0285447 A1 * | 11/2010 | Walsh | G01N 33/56911 435/7.1 |
| 2010/0315628 A1 * | 12/2010 | Mertsching | G01N 21/65 356/301 |
| 2011/0033847 A1 * | 2/2011 | Walsh | C12Q 1/04 435/6.16 |
| 2011/0143391 A1 * | 6/2011 | Maquelin | G01N 21/65 435/34 |
| 2011/0208432 A1 * | 8/2011 | Beaty | C12M 41/46 702/19 |
| 2011/0237446 A1 * | 9/2011 | Treado | G06V 20/698 506/8 |
| 2011/0281291 A1 * | 11/2011 | Ullery | G16B 40/20 250/282 |
| 2012/0134582 A1 * | 5/2012 | Treado | G01J 3/28 382/165 |
| 2012/0135454 A1 * | 5/2012 | Walsh | C12Q 1/04 435/34 |
| 2012/0161035 A1 * | 6/2012 | Bronk | G01N 21/6486 250/459.1 |
| 2012/0252049 A1 * | 10/2012 | Roscoe | C12Q 1/04 435/288.7 |
| 2012/0280146 A1 * | 11/2012 | Rizkallah | G01N 21/64 250/461.1 |
| 2013/0090260 A1 * | 4/2013 | Nova | B82Y 10/00 506/37 |
| 2013/0112895 A1 * | 5/2013 | Birlouez-Aragon | G01N 21/6486 250/461.1 |
| 2014/0032127 A1 | 1/2014 | Cardoso-Menezes et al. | |
| 2014/0117226 A1 * | 5/2014 | Giannakopulos | H01J 49/408 250/283 |
| 2014/0162301 A1 * | 6/2014 | Marcoux | C12Q 1/04 435/23 |

(56) References Cited

U.S. PATENT DOCUMENTS

| | | | | |
|---|---|---|---|---|
| 2014/0186879 | A1* | 7/2014 | Walsh | C12Q 1/04 435/34 |
| 2014/0186881 | A1* | 7/2014 | Walsh | C12Q 1/04 435/38 |
| 2014/0255980 | A1* | 9/2014 | Hasegawa | C12Q 1/04 435/288.7 |
| 2014/0257710 | A1* | 9/2014 | Volkovich | C12Q 1/689 435/6.15 |
| 2014/0343864 | A1* | 11/2014 | Strubel | G06F 18/2411 702/19 |
| 2014/0377795 | A1* | 12/2014 | Gannot | G16B 40/10 702/19 |
| 2015/0037877 | A1* | 2/2015 | Peng | G01N 21/6408 702/19 |
| 2015/0186754 | A1* | 7/2015 | Paauw | G06V 20/698 382/224 |
| 2015/0376677 | A1* | 12/2015 | Walsh | C12Q 1/6816 435/24 |
| 2016/0010138 | A1* | 1/2016 | Shamsheyeva | G06V 20/695 702/19 |
| 2016/0139027 | A1* | 5/2016 | Teramura | C12Q 1/02 382/133 |
| 2016/0209432 | A1* | 7/2016 | Reed | C12Q 1/22 |
| 2016/0333059 | A1* | 11/2016 | Brain | A61Q 19/00 |
| 2017/0023480 | A1* | 1/2017 | Gurfinkel | C12Q 1/04 |
| 2017/0073725 | A1* | 3/2017 | Upton | G01N 21/33 |
| 2017/0167973 | A1* | 6/2017 | Ismail | G16B 5/00 |
| 2017/0211123 | A1* | 7/2017 | Ramjeet | G01N 33/6851 |
| 2017/0218426 | A1* | 8/2017 | Shamsheyeva | C12Q 1/18 |
| 2018/0059126 | A1* | 3/2018 | Jones | A61B 5/015 |
| 2018/0299375 | A1* | 10/2018 | Young | G06N 5/01 |
| 2018/0355399 | A1* | 12/2018 | Novelli Rousseau | C12Q 1/18 |
| 2018/0360320 | A1* | 12/2018 | Werahera | A61B 5/0082 |
| 2018/0371521 | A1* | 12/2018 | Kostrzewa | C12Q 1/10 |
| 2019/0056407 | A1* | 2/2019 | Tamura | G01N 33/56911 |
| 2019/0178793 | A1* | 6/2019 | Ismail | G01N 33/48 |
| 2019/0219508 | A1* | 7/2019 | Büchs | C12M 41/46 |
| 2019/0276869 | A1* | 9/2019 | Beaty | C12Q 1/04 |
| 2019/0293620 | A1* | 9/2019 | Farkas | G01N 21/3563 |
| 2019/0300928 | A1* | 10/2019 | Krishnamurthy | C12Q 1/04 |
| 2019/0318807 | A1* | 10/2019 | O'Hara | G16B 50/10 |
| 2019/0323948 | A1* | 10/2019 | Leroux | G01N 21/25 |
| 2019/0369015 | A1* | 12/2019 | Ismail | G01N 33/48735 |
| 2020/0071647 | A1* | 3/2020 | Gilboa-Geffen | G01J 3/4406 |
| 2020/0118805 | A1* | 4/2020 | Strubel | H01J 49/0036 |
| 2020/0141864 | A1* | 5/2020 | Ismail | G01N 21/35 |
| 2020/0264167 | A1* | 8/2020 | Chen | G01N 21/31 |
| 2020/0268252 | A1* | 8/2020 | Litvinova | G01J 3/4406 |
| 2020/0309702 | A1* | 10/2020 | Barron | G01N 21/6486 |
| 2020/0354766 | A1* | 11/2020 | Galiano | G01N 21/35 |
| 2020/0386684 | A1* | 12/2020 | Nomura | G01N 21/6458 |
| 2021/0079441 | A1* | 3/2021 | Lallemand | G01J 3/2803 |
| 2021/0079442 | A1* | 3/2021 | Lallemand | G01N 21/359 |
| 2021/0102896 | A1* | 4/2021 | Miyashita | G01N 21/6428 |
| 2021/0106231 | A1* | 4/2021 | Radhakrishnan | A61B 5/7246 |
| 2021/0123085 | A1* | 4/2021 | Muhari | C12Q 1/18 |
| 2021/0156796 | A1* | 5/2021 | Maier | C12Q 1/04 |
| 2021/0199588 | A1* | 7/2021 | Falzarano | C12Q 1/04 |
| 2021/0262938 | A1* | 8/2021 | Falzarano | G01N 21/6486 |
| 2021/0389243 | A1* | 12/2021 | Sela | C12Q 1/04 |
| 2022/0076937 | A1* | 3/2022 | Takáts | H01J 49/0031 |
| 2022/0268751 | A1* | 8/2022 | Farkas | G01N 21/55 |
| 2023/0121472 | A1* | 4/2023 | Falzarano | G01N 21/6486 435/5 |

OTHER PUBLICATIONS

Anonymous: "Principal component analysis—Wikipedia", Nov. 24, 2019 (Nov. 24, 2019), XP055724867, Retrieved from the Internet: URL:https://web.archive.org/web/20191126102504/https://en.wikipedia.org/wiki/Principal_component_analysis.

Lu et al., "Application of Mid-infrared and Raman Spectroscopy to the Study of Bacteria ", Food and Bioprocess Technology; an International Journal, Springer-Verlag, New York, vol. 4, No. 6, Jan. 22, 2011 (Jan. 22, 2011), pp. 919-935.

Hamasha., "Raman spectroscopy for the microbiological characterization and identification of medically relevant bacteria", Jan. 1, 2011; pp. 1-187.

Burgas et al., "N-dimensional extension of unfold-PCA for granular systems monitoring", Engineering Applications of Artificial Intelligence., vol. 71, May 1, 2018, pp. 113-124, Applicant's copy illegible. A legible copy is attached and has been considered.

International Search Report (with English Translation) and Written Opinion (with Machine Translation) issued on Feb. 16, 2021 in corresponding International Patent Application No. PCT/FR2020/052216; 19 pages.

* cited by examiner

[Fig. 1]
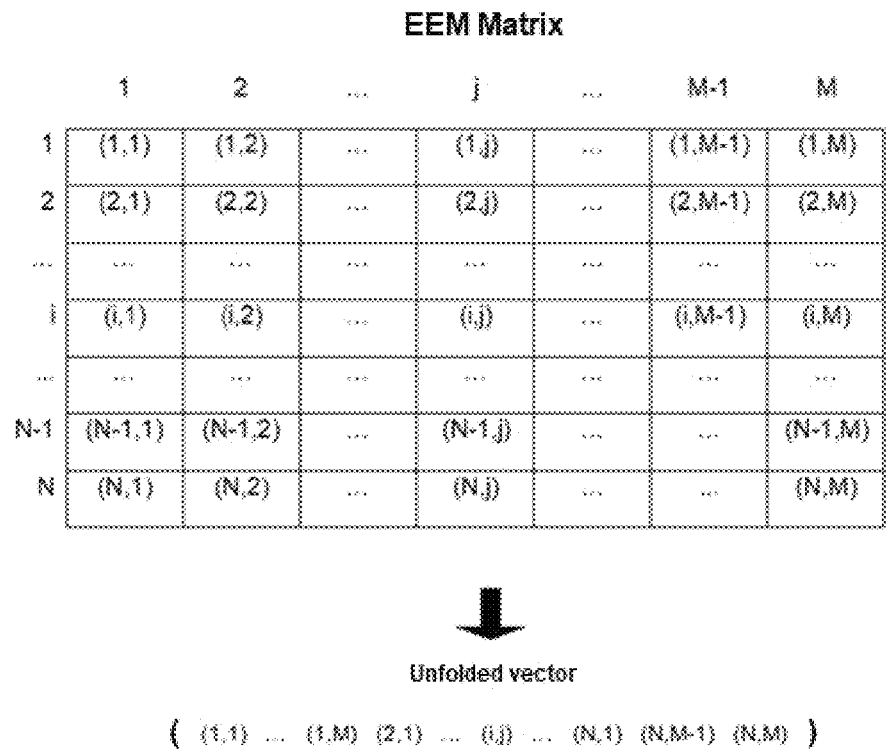
[Fig. 2]
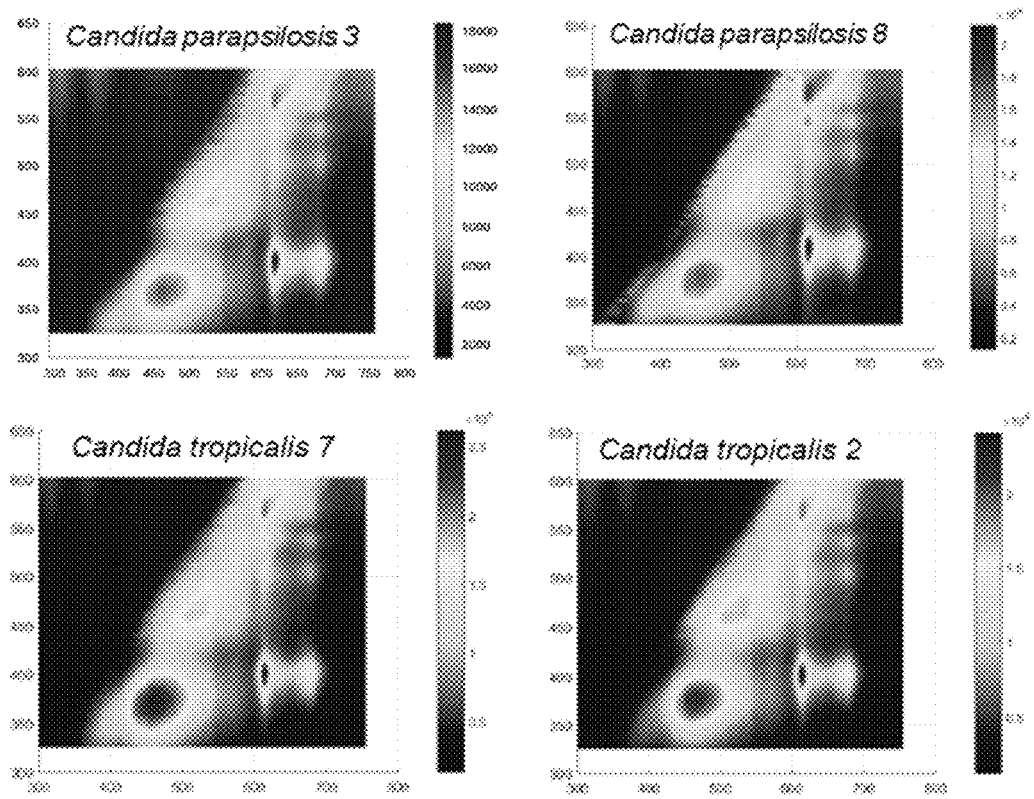

[Fig. 3]
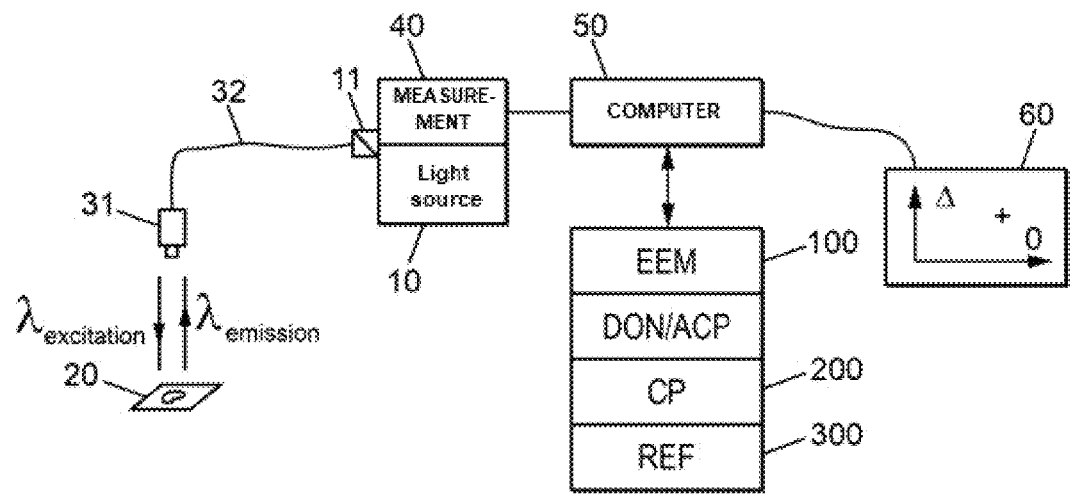
[Fig. 4]
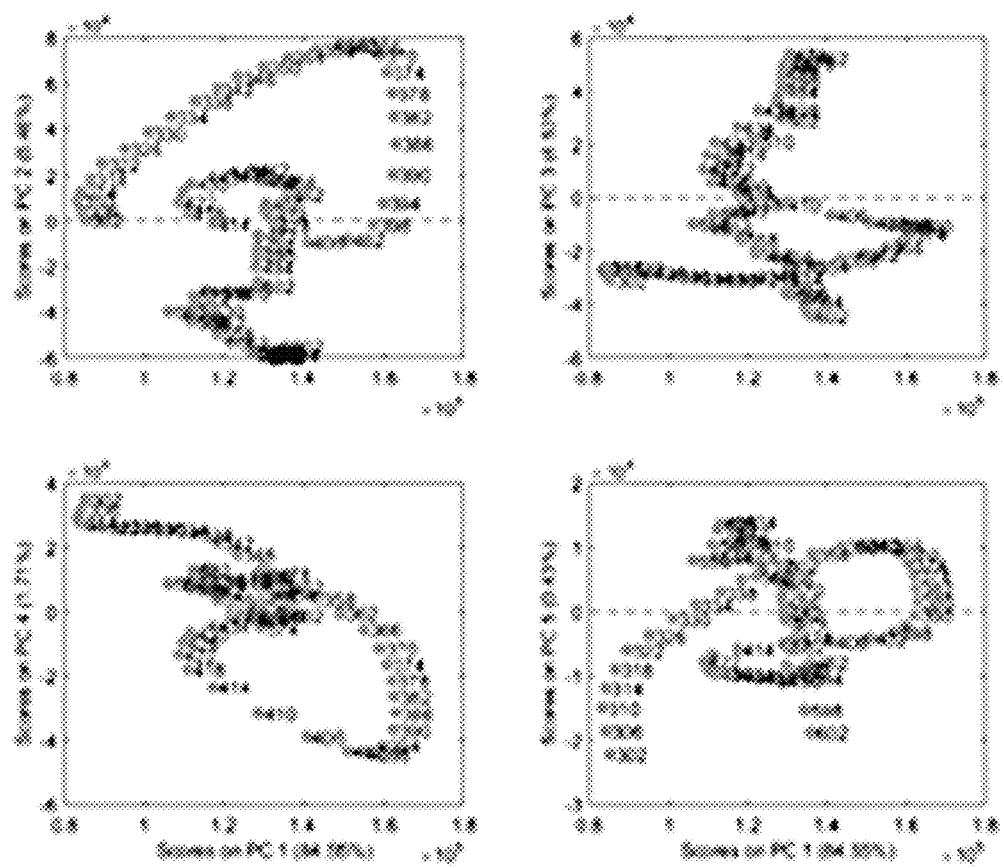

[Fig. 5]
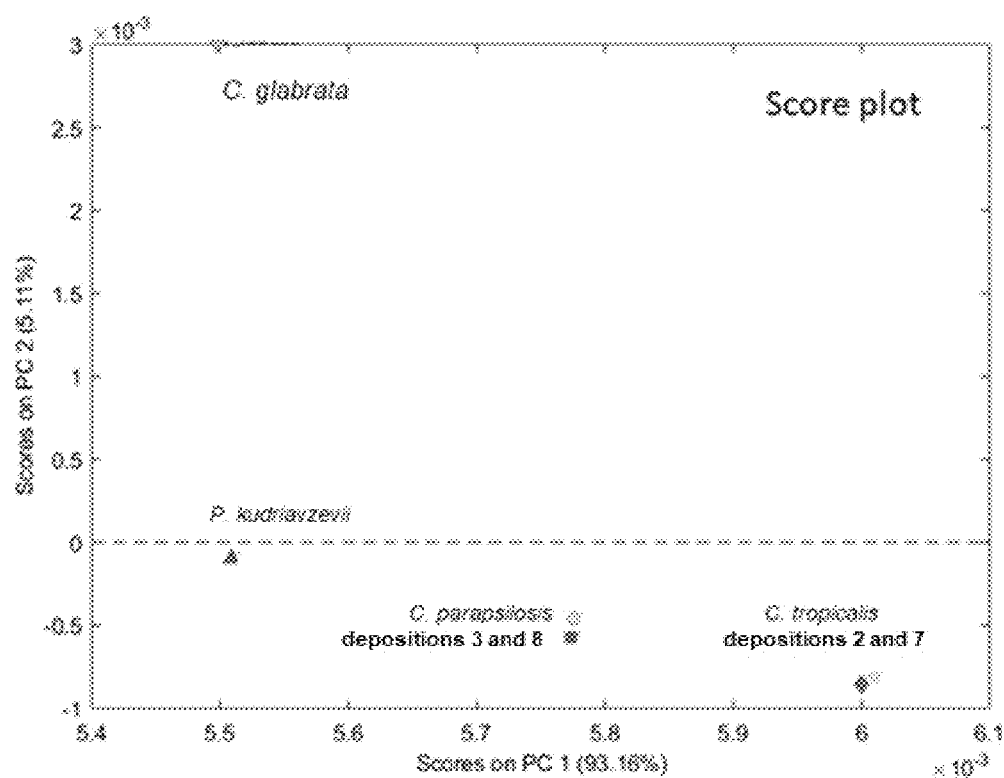

METHOD FOR THE QUICK IDENTIFICATION OF MICROORGANISMS BY ANALYSIS OF EXCITATION-EMISSION MATRICES

FIELD

The invention relates to the field of methods for identifying and characterising microorganisms. The present invention is based on the analysis of Excitation-Emission matrices (or EEM matrices in the rest of the disclosure) and is of interest in all fields relating to the identification of microorganisms, in particular the medical sector, for example in research laboratories, microbiology, bacteriology or parasitology-mycology laboratories, Hospital Centres and medical biology analysis laboratories.

BACKGROUND

Infections due to microorganisms such as bacteria, yeasts, filamentous fungus, parasites or micro-algae affect immunodeficient individuals as well as immunocompetent individuals. Immunodeficient individuals however have a higher risk of severe infections. The infections affecting immunodeficient individuals are often associated with high levels of morbidity and mortality. In order to initiate the suitable treatment, it is essential to correctly and quickly identify the microorganism that is responsible for the infection.

The reference method for identifying microorganisms is based on the sequencing of a particular region of the genome of said microorganism. This method involves extracting the DNA and analysing the sequence obtained. This method is extremely reliable but requires equipment and suitable premises. In the absence of automation, this method is expensive and time consuming.

The limits of these molecular techniques led to the development of alternative methods, based on mass spectrometry, in particular mass spectrometry of the MALDI-TOF type which is increasingly widely used in microbiology, bacteriology, or parasitology-mycology laboratories of hospital centres as in medical biology analysis laboratories for identifying microorganisms.

The cost of a mass spectrometer of the MALDI-TOF type is high. This equipment requires annual maintenance which immobilises the equipment for 24 to 48 h, with in particular as a possible consequence for accredited laboratories non-compliance with commitments in terms of lead time for rendering results.

In the framework of a method for identification by mass spectrometry of the MALDI-TOF type, depositing the microorganism on a target determines the quality of the spectral fingerprints, and the resolution power. Indeed, the deposition has to be regular and thin, i.e. in a "thin layer". After drying and deposition of a matrix, it must be possible to extract the proteins from the microorganism and to ionise them so as to obtain after separation in the column of the MALDI-TOF a mass spectrum that makes it possible, via the analysis of ions with a low molecular weight, to determine the identity of the microorganism.

The profile of the peaks obtained by mass spectrometry of the MALTI-DOF type is then compared to a database constituted of reference spectra established for each one of the microorganisms present in the base. The base is supplied with individual spectra obtained for different strains of microorganisms, sometimes cultivated in different conditions (culture mediums, age of the cultures), from which superspectra characteristic of the species and independent of the culture conditions can be defined.

There are however differences, including in the reference spectra, according to the MALTI-DOF equipment used. The performances, in terms of discriminating power and of reliability in the final identification, are also according to the algorithms used. Thus, two laboratories that have two different pieces of equipment can sometimes conclude to contrary identifications for the same microorganism.

The method of identification by mass spectrometry of the MALTI-DOF type thus has several disadvantages. The equipment used and the annual maintenance thereof make it an expensive method. For certain suppliers, the equipment is bulky. It is therefore difficult for a laboratory to consider holding several pieces of equipment of this type, and this equipment cannot be transported from one department or from one laboratory to another.

TECHNICAL PROBLEM

The inventors have implemented a method for identifying microorganisms that is as reliable as the methods known by a person skilled in the art until today, that do not have the disadvantages listed hereinabove.

The method for identifying that improves the current situation is based on an analysis of the main components of an Excitation Emission matrix (EEM) characteristic of a microorganism using at least one reference matrix (EEMr), the matrices being obtained for example using a fluorometer.

SUMMARY

The microorganism is illuminated with a light characterised by its wavelength.

In the framework of the present disclosure, the term light means a visible or invisible electromagnetic wave, more preferably an electromagnetic wave chosen from ultraviolet (UV) to infrared (IR) and passing through the visible range.

The microorganism thus illuminated then passes from a so-called fundamental state to an excited state by absorbing photons called excitation photons. The excited microorganism then recovers its fundamental state by re-emitting photons called emission photons. According to the excitation wavelength, i.e. the wavelength of the excitation photos, the emission wavelengths, i.e. the wavelengths of the re-emitted photons, can change and thus according to the microorganism studied.

The method then consists of collecting, for each given excitation wavelength, the emission spectrum of the sample. The emission spectrum represents the quantities of emission photos measured at different wavelengths, the quantity of emission photos being directly proportional to a power or a light energy according to the classical laws of photonics and to the specific interaction with the sample studied.

The method is rendered all the more reliable as for the same microorganism, different excitation wavelengths are used and as for each excitation wavelength an emission spectrum is collected.

Identifying a microorganism thus consists of measuring and analysing the emission spectra emitted by the microorganism after having been successively illuminated by lights of different wavelengths.

BRIEF DESCRIPTION OF THE DRAWINGS

Other characteristics, details and advantages of the invention shall appear when reading the detailed description hereinafter, and when analysing the accompanying drawings, wherein:

FIG. 1 shows a diagram illustrating an unfolding of an EEM matrix into a vector characteristic of a microorganism according to an embodiment of the invention;

FIG. 2 shows four EEM matrices obtained for two different strains of reference microorganisms, each one being analysed twice;

FIG. 3 shows a diagram of an embodiment of the present invention

FIG. 4 shows the projections of four EEM matrices obtained for two different strains of reference microorganisms, each one being analysed twice, according to the main components obtained after the analysis of the main components of the four corresponding EEM matrices;

FIG. 5 shows a graph according to PC1 and PC2 of four points coming from the projection of four reference vectors.

DETAILED DESCRIPTION

An object of the method is thus a method for identifying a microorganism to be identified comprising the following steps:
- obtaining an Excitation-Emission EEM of the microorganism to be identified,
- analysing the main components of said EEM matrix using at least one Excitation-Emission reference matrix EEMr,
- projecting the result of the analysis onto a plane defined by two main components, and
- identifying the microorganism to be identified.

Identifying a microorganism using the method disclosed herein is quick. It is possible to identify a microorganism and for example a microorganism responsible for an infection.

The method according to the invention thus makes it possible to reduce a laborious EEM matrix analysis to a simple comparison of a graph in a plane of points characteristic of a microorganism to be identified.

According to another aspect, a computer program is proposed including instructions for the implementation of all or a portion of a method such as defined in the present when this program is executed by a processor.

According to another aspect of the invention, a non-transitory recording medium is proposed, that can be read by a computer, on which is recorded a microorganism identification program according to the present invention.

According to another aspect of the invention, a non-transitory recording medium is proposed, that can be read by a computer, on which the EEMr matrices of the reference microorganisms are recorded.

Obtaining an EEM Matrix

A first step of the present method comprises obtaining an Excitation-Emission (EEM) characteristic of a microorganism to be identified.

Microorganism to be Identified

The microorganism to be identified can be a bacterium, yeast, a filamentous fungus, a micro-alga or a parasite. These strains are the cause of most infections in the medical sector.

The culture of said microorganism can be carried out in a liquid medium, for example in a broth or in a semi-solid medium, for example on an agar medium a microorganism put into culture then having the form of colonies.

In the case where new species of microorganisms were discovered, the present invention would be equally usable and effective. It would simply be sufficient to characterise a new reference organism.

Each one of the microorganisms is identified by a species according to the known classification of microorganisms, even by its genotype. The present invention thus makes it possible to identify the genus of the microorganism, preferably the species or the species complex of the microorganism.

The microorganisms that can be identified by the method of the invention are all types of microorganisms, whether or not pathogenic, encountered whether in industry or clinically, that can encounter phenomena of resistance to antimicrobial agents. This can be, preferably, bacteria, moulds, yeasts, micro-algae or parasites.

By way of example of such microorganisms, mention can be made of the Gram-positive, Gram-negative bacteria and Mycobacteria. By way of example of Gram-negative bacteria, mention can be made of those of the genera: *Pseudomonas, Escherichia, Salmonella, Shigella, Enterobacter, Klebsiella, Serratia, Proteus, Acinetobacter, Citrobacter, Aeromonas, Stenotrophomonas, Morganella* and *Providencia*, and in particular the species *Escherichia coli, Enterobacter cloacae, Enterobacter aerogenes, Klebsiella pneumoniae, Klebsiella oxytoca, Pseudomonas aeruginosa, Providencia rettgeri, Pseudomonas putida, Stenotrophomonas maltophilia, Acinetobacter baumannii, Morganella morganii, Proteus mirabilis, Salmonella senftenberg, Serratia marcescens, Salmonella typhimurium*, etc. By way of example of Gram-positive bacteria, mention can be made of those of the genera: *Enterococcus, Streptococcus, Staphylococcus, Bacillus, Listeria* and *Clostridium*.

By way of example of yeasts, mention can be made of those of the genera: *Candida, Blastobotrys, Cryptococcus, Diutina, Kluyveromyces, Magnusiomyces, Meyerozyma, Pichia, Rhodotorula, Saccharomyces, Trichomonascus, Trichosporon, Wickerhamiella, Yarrowia*, and in particular the species *Candida albicans, Candida glabrata, Candida parapsilosis, Candida tropicalis, Blastobotrys adeninivorans, Cryptococcus neoformans, Diutina rugosa, Kluyveromyces marxianus, Magnusiomyces clavatus, Meyerozyma guilliermondii, Pichia kudriavzevii, Rhodotorula mucilaginosa, Saccharomyces cerevisiae, Trichomonascus ciferrii, Trichosporon cutaneum, Wickerhamiella pararugosa, Yarrowia lipolytica*, etc.

By way of example of filamentous fungus, mention can be made of dermatophytes, moulds, and dimorphic fungi. By way of example of dermatophytes, mention can be made of those of the genera: *Arthroderma, Epidermophyton, Microsporum, Nannizzia, Paraphyton*, and *Trichophyton*, and in particular the species *Arthroderma uncinatum, Epidermophyton floccosum, Microsporum canis, Microsporum audouinii, Nannizzia gypsea, nannizzia persicolor, Paraphyton cookei, Trichophyton rubrum, Trichophyton interdigitale, Trichophyton tonsurans*, etc. By way of examples of moulds, mention can be made of those of the genera: *Alternaria, Arthrographis, Aspergillus, Bissochlamys, Cladosporium, Cunninghamella, Exophiala, Fusarium, Geotrichum, Lichtheimia, Lomentospora, Mucor, Neoscytalidium, Penicillium, Purpureocillium, Rasamsonia, Rhizomucor, Rhizopus, Sarocladium, Scedosporium, Scopulariopsis, Syncephalastrum, Trichoderma, Verruconis*, and in particular *Alternaria infectoria, Arthrographis kalrae, Aspergillus flavus, Aspergillus fumigatus, Aspergillus nidulans, Aspergillus niger, Aspergillus terreus, Aspergillus versicolor, Byssochlamys spectabilis, Cladosporium cladosporioides, Cunninghamella bertholletiae, Exophiala dermatitidis, Fusarium dimerum, Fusarium fujikuroi, Fusarium oxysporum, Fusarium solani, Geotrichum candidum, Lichtheimia corymbifera, Lomentospora prolificans, Mucor circinelloides, Neoscytalidium dimidiatum, Penicillium expansum, Purpureocillium lilacinum, Rasamsonia argillacea, Rhizomucor pusillus, Rhizopus oryzae, Sarocladium kiliense, Sce-*

*dosporium apiospermum, Scopulariopsis brevicaulis, Syncephalastrum racemosum, Trichoderma harzianum, Verruconis gallopava,* etc.

The microorganism studied can be obtained from a blood sample, a skin sample and appendages (nails, hairs, hair), saliva, mucosa, an expectoration, or from any other sample.

The sample and the putting into culture of the microorganism to be identified are carried out according to the methods known to a person skilled in the art and/or the user.

The microorganism in a liquid medium or in a semi-solid medium culture can be stored several days for a deferred analysis or repeated over time. The microorganism can thus be transported from one laboratory to another or from one hospital to another.

In the case where the microorganism is put into a semi-solid medium culture, such as an agar medium, the analysis of the microorganism can be carried out directly on a colony obtained on the medium on which the microorganism was cultivated.

The present invention thus makes possible a direct analysis of the sample contrary to various methods of identification of the prior art, for example the method via MALTI-DOF mass spectrometry which requires a prior disposition of the microorganism to be identified on a target.

In the case where the microorganism is put into a liquid medium culture, such as a broth, the analysis of the microorganism is carried out after formatting said microorganism on a solid support.

The solid support can be chosen such that its intrinsic emission in the study wavelength ranges does not interfere with the measurement of the emission of the sample in said study ranges (range of excitation wavelengths and range of emission wavelengths).

The solid support is preferably chosen non-fluorescent and/or non-luminescent in the range of study wavelengths.

The solid support is for example a support made from glass, metal, plastic, composite or wood.

Advantageously, the method for identifying according to the invention can follow a first identification. The first identification can be carried out by simple visual identification of the type of microorganism, more preferably with a microscope, by the user. Then a second characterisation according to the method of the present invention is carried out in order to identify the microorganism, i.e. the identification of the genus, or, preferably, of the species of a microorganism deposited beforehand on a solid support or cultivated on a semi-solid medium.

Excitation-Emission Matrix (EEM)

An Excitation-Emission Matrix EEM is a matrix comprising N lines and M columns.

Each line of the EEM matrix corresponds to an emission spectrum measured at a given excitation wavelength.

Thus, a matrix of N lines and M columns means that N emission spectra were measured for N different excitation wavelengths. For a given excitation wavelength, the emission spectrum measured comprises M values of light intensity measured for M different emission wavelengths.

In the present disclosure, the "light intensity" measured at an emission wavelength can be expressed according to the usual photometric magnitudes (for example radiance, luminance, energy, power, number of photons), or without a unit. In the case where the light intensity is expressed without a unit, the value of the measurement is conventionally given by the spectrometer as a number comprised between 1 and $2^p$, p being the number of bits of the analogue-digital converter.

For each excitation wavelength, a measurement of the emission spectrum is taken implementing devices discussed hereinafter.

In the rest of the disclosure, it is considered that an EEM matrix of a microorganism to be identified comprises N lines and M columns such that: N is a positive integer that corresponds to the number of excitation wavelengths; N is preferably comprised between 2 and 20,000, preferably 10 and 1,500; M is a positive integer that corresponds to the number of emission wavelengths; M is preferably comprised between 10 and 50,000, preferably between 350 and 1,500.

In the framework of the present invention, the EEM matrix is advantageously obtained for a range of at least 2 excitation wavelengths, preferably at least 100 excitation wavelengths, and more preferably at least 500 excitation wavelengths comprised between 140 and 2,000 nm, preferably between 250 and 900 nm, in steps from 0.1 to 20 nm, preferably in steps from 0.1 to 10 nm, and more preferably in steps of 0.8 nm, and a range of at least 10 emission wavelengths, preferably at least 100 emission wavelengths, and more preferably at least 500 emission wavelengths comprised between 180 and 5500 nm, preferably between 200 and 900 nm and more preferably between 220 and 750 nm, in steps comprised between 0.1 nm and 20 nm, preferably in steps between 0,1 and 10 nm and more preferably in steps of 1 nm.

The excitation wavelengths can be chosen over a very wide range of the electromagnetic spectrum. They are chosen in such a way as to excite the sample. By way of example, the excitation wavelengths can be chosen from the ranges of gamma rays, X rays, far infrared, microwaves and radio waves.

The excitation wavelengths are preferably chosen from ultraviolet to infrared.

The emission wavelengths can be chosen over a very wide range of the electromagnetic spectrum. They are chosen in such a way that an emission spectrum regardless of the measurement range can be carried out according to an excitation wavelength. By way of example, the emission wavelengths can be chosen from the ranges of gamma rays, X rays, the visible range, infrareds, microwaves and radio waves.

The emission wavelengths are preferably chosen from ultraviolet to infrared.

Obtaining an EEM Matrix

Obtaining an EEM matrix of a microorganism to be identified can be carried out using a measuring device, such as a fluorometer, comprising a light source that emits excitation wavelengths and a measuring unit of the emission spectrum of the microorganism.

The light source can be a light source emitting a continuous or discontinuous spectrum.

A light source emitting a discontinuous spectrum can be chosen from a light source carried out using several lasers or several LEDs of different wavelengths.

A light source emitting a continuous spectrum can be chosen for example from a halogen lamp, a fluorescent tube, a neon, a sodium lamp, a xenon lamp or an incandescent lamp.

In the case where the light source is a continuous source, said source is coupled to a monochromator to select the narrowest possible band of an excitation wavelength ($\lambda_{excitation}$) from the wider range of wavelengths of the continuous light source.

A monochromator is for example a network dispersive system, a prism, a double monochromator in subtractive or additive mode.

The monochromator makes it possible to obtain excitation wavelengths comprised between 140 and 2,000 nm, preferably between 250 and 900 nm, in steps from 0.1 to 20 nm, preferably in steps from 0.1 to 10 nm, and more preferably in steps of 0.8 nm.

The measuring unit of the emission spectrum allows for the measurement of the emission spectrum of the microorganism to be identified for emission wavelengths ($\lambda_{emission}$) comprised between 180 and 5,500 nm, preferably between 200 and 900 nm and more preferably between 220 and 750 nm, in steps comprised between 0.1 nm and 20 nm, preferably in steps between 0,1 and 10 nm and more preferably in steps of 1 nm.

The measuring unit comprises a monochromator and a sensor.

The monochromator is for example a network dispersive system, a prism, a slot, a double monochromator in subtractive or additive mode.

The sensor can be a CMOS, CCD sensor, a CMOS bar, a CCD bar.

Such a sensor allows for a quick and reliable measurement of the emission spectrum.

The measuring device such as a fluorometer can be coupled to a microscope or to a fibre.

In the case where the measuring device is coupled to a fibre, the user can advantageously bring the fibre directly above a microorganism in a culture or deposited on a solid support in order to illuminate it and analyse its emission spectrum simply and quickly according to the method of the present invention.

The fibre allows for the excitation of the sample and the collection of the light emitted by the sample. The optical fibre can be coupled to a lens or to a measuring probe, placed at the end of the optical fibre, focussing the excitation light on the microorganism and collecting the emission light of said microorganism. According to the objective, the zone of study can for example be a zone with an average diameter of about 50 µm².

The optical fibre can be a single-mode or multi-mode optical fibre or with a variable index.

Such a measuring device, for example a fluorometer, a fibred fluorometer or a fluorometer coupled to a microscope, is easy to use and limits the size of the system. It can be transported and is inexpensive. The method object of the present invention therefore advantageously makes it possible to identify with precision a microorganism using equipment that is easier to use and that is less bulky that the equipment of the prior art, for example a MALDI-TOF spectrometer.

Analysing an EEM Matrix Using at Least One Reference EEMr Matrix

Comparing the EEM matrix of the microorganism to be identified using at least one other reference EEMr matrix comprises at least the following steps:
unfolding the EEM matrix of the microorganism to be identified after obtaining said matrix into a single characteristic vector of the microorganism; and
analysing the main components of a data matrix, said data matrix comprising said vector obtained in the preceding step using at least one other vector (vr) coming from the unfolding of an EEMr matrix of a reference microorganism, said EEMr matrix being obtained in the same conditions as the EEM matrix.

Reference Microorganism

A reference EEMr matrix is an Excitation-Emission matrix obtained according to the present invention from a reference microorganism, i.e. a known microorganism that is preferably known at least to the species.

A "reference microorganism" is for example a microorganism strain deposited in a collection of international cultures (for example, HEM in Belgium, CBS in the Netherlands, ATCC in the USA, etc.).

The reference microorganism is characterised by an EEMr matrix and/or a reference vector. The reference vector being obtained according to the EEMr matrix.

The EEMr matrices and/or the vectors characteristic of the reference microorganisms can be stored in memory on a conventional electronic support or on a computer server.

Analysing the EEM matrix of the microorganism to be identified is advantageously carried out with a large number of reference EEMr matrices for great reliability in the identification of the microorganism.

Matrix Unfolding

Certain methods known to a person skilled in the art consisting of directly analysing the EMM matrix obtained for the microorganism studied; i.e. comparing said EEM matrix with reference microorganism EEMr matrices.

However, these conventional methods known to a person skilled in the art are not very reliable. Indeed, two EEM matrices obtained for two different microorganisms can be very close, i.e. the emission spectra obtained for each one of the microorganisms are very close. This proximity can lead to an incorrect identification; thus, a person skilled in the art implementing a known method such as discussed hereinabove can consider two microorganisms as identical although in reality they are different.

In order to prevent such an analysis error, the inventors have implemented a step of unfolding the EEM matrix of the microorganism to be identified into a single vector characteristic of said microorganism.

In the present disclosure, the term "vector" means a vector of dimension (1,x), x being a positive integer.

In the present disclosure, the term "unfolding" means the algebraic operation consisting of transforming a matrix of dimension (N,M) into a vector of dimension (1,N*M).

At the end of the unfolding operation, the value (i,j) of the EEM matrix becomes the value (1,(i−1)*M+j) of the vector thus obtained, or unfolded vector in the rest of the disclosure.

The unfolded vector thus obtained is characteristic of the microorganism studied. Each microorganism studied can correspond to a characteristic unfolded vector.

Data Matrix

The unfolded vector characteristic of the microorganism to be identified is analysed using at least one reference vector coming from the unfolding of at least one EEMr matrix of a reference microorganism recorded with the same excitation and emission wavelengths.

In the case where an EEM matrix of a microorganism to be identified does not comprise the same study wavelengths (emission and excitation wavelengths), whether in terms of number or in terms of step, as a reference EEMr matrix, a series of conventional mathematical operations makes it possible to have the wavelengths of the EEM matrix correspond with the study wavelengths of the reference EEMr matrix.

The normalised data matrix comprises at least two lines corresponding to an unfolded vector of the microorganism to be identified and to a reference vector.

The unfolded vectors composing the data matrix are advantageously obtained according to the same protocol following the same method as the present disclosure. That is to say, each unfolded vector characteristic of a reference microorganism or of a microorganism to be identified has the same dimensions.

Thus, in the present disclosure, the term "data matrix" means a matrix that comprises U lines and V columns.

U corresponds to the number of unfolded vectors comprising the normalised data matrix, U being an integer greater than or equal to 2.

V corresponds to the number of columns of the unfolded vectors. In the present disclosure, V is typically N*M.

In the present disclosure, the term "normalised data matrix" means a data matrix of which all the values are divided by the maximum value of said data matrix. This normalisation makes it possible to identify the microorganisms between them without adding any measurement bias.

Indeed, two spectra of two measurements of the same microorganism can even so have slight differences in terms of intensity (for example according to the quantity of bacteria or fungal cells present). Normalising these spectra makes it possible to avoid this measurement bias and to focus the analysis on the characteristic shape of the spectrum rather than on the intensities measured.

The normalised data matrix comprises U unfolded vectors or individuals in the rest of the disclosure. Each individual is associated with a succession of emission spectra, or V quantitative variables in the rest of the disclosure.

The U individuals thus correspond to the U microorganisms studied, i.e. an unfolded vector of a microorganism to be identified using at least one reference vector coming from the unfolding of at least one EEM matrix of a reference microorganism.

The V quantitative variables are the V columns of the normalised data matrix. A quantitative variable corresponds to a measurement of light intensity carried out at a particular emission wavelength for a given excitation wavelength.

Each individual can be represented by a point in a real positive space Rv with V dimensions. Such a representation is not very satisfactory because it makes identifying the microorganism very difficult.

Analysing the Main Components

Analysing the main components (PCA, or principal component analysis), is a data analysis method and more generally multivariate statistics, which consists of transforming variables that are linked together (referred to as "correlated variables" in statistics) into new variables that are decorrelated from one another. The new variables that are decorrelated between them obtained following the analysis of the main components are called "main components".

The step consisting of analysing the normalised data matrix as main components is for example carried out using a computer or any other technical means allowing for an analysis of the main components, for example a calculator or an embedded calculation system.

Following the analysis of main components, a new data matrix called adjusted matrix is obtained. The adjusted matrix comprises the same number of lines and the same number of columns as the normalised data matrix. The variables of the adjusted matrix are the "main components" of the normalised data matrix. Said main components are linear combinations of variables of the normalised data matrix.

Conventionally, the main components can be classified according to the quantity of information that they transport. The main component that transports the largest quantity of information is the main component of a greater weight. The projection of the different observables according to this main component has the greatest statistical variance of the observables. This is therefore the variable of the adjusted matrix for which the individuals have the greatest decorrelation between them. Inversely, the main component of the lowest weight is the variable of the adjusted data matrix for which the individuals are the least decorrelated.

In the present disclosure, the term classified main components means main components sorted according to their weight, the main component of the greatest weight is the main component 1 or PC1 and the main component of the lowest weight is the main component V or PCV for a given matrix comprising V variables.

The first column of the adjusted data matrix is PC1, the second column PC2 and so on until PCV.

Projecting the Result of the Analysis of the Main Components

The individuals of the adjusted data matrix can be projected onto a new plane Rv with V dimensions of which the direction vectors are the V main components.

Such a projection is time consuming, laborious and requires additional mathematical and/or computing processing in order to measure for example the algebraic distances between the different characteristic points of the different individuals composing the normalised data matrix.

The inventors have implemented an advantageous method that is simple and quick to use comprising a step of projecting vectors of the data matrix onto a plane defined by two main components of large weight, advantageously by the two main components of greater weight.

This projection according to the two main components of greater weight allows the user to quickly and without difficulty view the characteristic points of the microorganisms, the characteristic points of the microorganisms being the projections of the unfolded vectors onto the same plane.

The projection can advantageously be carried out by any support whatsoever that allows for a visualisation of the plane according to two different main components, preferably the main components of the greatest weight (i.e. PC1 and PC2).

Such a support is for example a television screen, a computer screen, a tablet or a mobile telephone. Said support is not necessarily connected or in the same room as the measuring device, i.e. the device emitting the excitation wavelengths and measuring the emission spectrum.

Thus, in an embodiment of the present invention, the user can have a visualisation support that is portable and independent of the measuring device implemented to obtain the EEM matrix of the microorganism to be identified.

Advantageously, the method of the present invention can allow an operator to carry out the steps of the method in the same working zone, for example an analysis or research laboratory, then to receive the results of the analysis via for example a mobile telephone, a tablet or a portable computer. The operator can then continue their work without having to wait for the results in the analysis laboratory. The different steps of the method of the invention can be carried out by different operators and can be located in zones that are very far apart as long as the result obtained is shared with a visualisation support. Communicating the result of the identification can be carried out by any means whatsoever known to a person skilled in the art, for example via the internet network, a Wi-Fi network, a Bluetooth network or an NFC communication.

Projecting vectors of the data matrix can be carried out in a plane defined by two main components other than the main components of greater weight. In this case, the user can choose the main components that they wish and project the vectors of the adjusted matrix according to these main components.

Likewise, projecting the vector of the microorganism to be identified and at least one reference vector of the data matrix can be carried out in a space defined by at least three main components other than the main components of greater weight. In this case, the user can choose the main components that they wish and project the characteristic vectors of the microorganism strains according to these main components. A projection making use of colours or a three-dimensional view can make it possible to easily view the projections of vectors in a space with more than two dimensions.

Projecting the result of the analysis onto a plane defined by two main components, or a space defined by three main components can further comprise displaying a list of distances between the projections of the microorganism and of the reference microorganism.

Identifying the Microorganism

Identifying the microorganism consists of discriminating the points coming from the projection between them. Two close points on the two-dimensional projection are characteristic of two identical microorganisms.

In the present disclosure, two vectors are said to be "close" according to the visual appreciation of the operator. In this case, the operator directly identifies the points coming from the projection of the characteristic vectors of the microorganism strains in the space according to the main components PC1 and PC2.

That is why it can be preferable to analyse an EEM matrix of a microorganism to be identified using several reference EEMr matrices for example using at least 5 EEMr matrices, preferably at least 100 EEMr matrices, and more preferably at least 200 EEMr matrices.

The identification can also be carried out automatically for example by a computer. This analysis then consists of calculating the algebric distance between two points and of defining a scalar beyond which the points are considered as close. The scalar can be adjusted as the measurements are taken.

The representation coming from the method of the present invention can allow for the differentiation of several microorganism strains between them or the identification of an unknown microorganism in comparison with a panel of at least one reference microorganism.

Optional Steps

Optionally, the present invention can have intermediate data processing steps.

A filter can be coupled to the measuring device to cut off certain specific emission wavelengths. Digital processing can also be carried out so as to eliminate so-called parasitic reflections obtained during the measurement of the emission spectrum, for example a digital processing can be carried out so as to eliminate or decrease Rayleigh scattering, backscatter, diffusion intrinsic to the sample and no longer characteristic of the microorganism to be identified.

Preferably, obtaining the EEM matrix of the microorganism to be identified can comprise a physical filtering (using filters) or digital filtering of the noise during the obtaining of the EEM matrix.

Preferably, obtaining the EEM matrix of the microorganism to be identified can further comprise a physical filtering (using filters) or digital filtering of the Rayleigh component.

The process of acquiring EEM matrices, the optional image processing, the normalisation of the data matrix can advantageously be automated. Preferably, no adjusting of parameters will be asked of the operator.

The present invention requires very little biological material and technical gestures.

The present invention can be quickly implemented in analysis or research laboratories, but applications in all fields concerned by the identification of microorganisms is possible, for example in animal microbiology, microbiological control in the environment, in the agri-food industry or in the field of plant productions.

DESCRIPTION OF EMBODIMENTS

The drawings and the description hereinafter contain, for the most part, elements of a certain nature. They can therefore not only be used to better understand the present invention, but also to contribute to the definition thereof, where applicable.

FIG. 1 shows an operation of unfolding the matrix according to the method of the present invention. The EEM matrix of FIG. 1 has an integer i of lines, i being a positive integer comprised between 1 and N. The EEM matrix of FIG. 1 shows an integer j of columns, being a positive integer comprised between 1 and M. The unfolded vector is then of dimension (1,N*M). The element (i,j) of the EEM matrix becoming the element (1,(i−1)*M+j) of the unfolded vector.

FIG. 2 illustrates EEM matrices of which the light intensity is represented according to a grey scale. The EEM matrices are two independent EEM matrices obtained according to the same method using the microorganism *Candida parapsipolis* and two independent EEM matrices obtained according to the method using the microorganism *Candida tropicalis*. The EEM matrices of the microorganisms *Candida parapsipolis* and *Candida tropicalis* seem to be identical although the microorganisms studied are indeed different.

Reference is now made to FIG. 3. A microorganism studied 20 is illuminated by a light of excitation wavelength $\lambda_{excitation}$.

The light source 10 is a continuous light source coupled to a double monochromator in subtractive mode 11.

The light source 10 is advantageously connected to an optical fibre 32 coupled to a lens 31. The lens 31 makes it possible to select a more or less wide zone on the microorganism in culture. For example, the measuring zone is less than 50 µm. The lens is chosen according to the desired measuring zone.

At each excitation wavelength, the emission spectrum of the strain 20 is measured using a measuring unit 40 comprising a double monochromator in substrative mode and a CCD sensor.

The optical fibre coupled to the lens 31 refocuses the exciting light on a point of the microorganism and the light re-emitted by the microorganism is concentrated in the optical fibre to the measuring unit 40.

The measuring device thus makes it possible to obtain the emission spectrum of the strain for a given excitation wavelength. The operation is repeated for each one of the study excitation wavelengths.

Thanks to one or two monochromators operating in subtractive mode 11, the change in the excitation wavelength is very quick and the measurement of the emission spectrum also. The operation of obtaining the EEM matrix is thus quick, about a minute.

At the end of the successive illuminating of the strain 20 by different excitation wavelengths, an Excitation Emission matrix EEM 100 as shown in FIG. 2 is obtained, characteristic of the microorganism studied.

This EEM matrix is unfolded according to the diagram of FIG. 1 so as to obtain a single vector characteristic of the sample. This operation is for example carried out using a computer 50. This computer comprises for example in memory 300, a panel of at least one unfolded reference vector REF. The at least one reference vector REF and the unfolded vector characteristic of the microorganism studied are inserted into a data matrix DON.

The data matrix DON is normalised, then analysed as main components 200 to give a new adjusted matrix ACP.

The various values of the matrix ACP are then projected onto a plane according to PC1 and PC2 (i.e. in general the first two columns of the adjusted matrix) and displayed using a screen 60.

EXAMPLES

*Candida parapsilosis, Candida tropicalis*

Reference is now made to FIG. 3. FIG. 3 shows four EEM matrices obtained according to an embodiment of the present invention.

The strains of microorganisms studied are reference strains of *Candida parapsilosis* and *Candida tropicalis*, each strain being deposited in duplicate (depositions 3 and 8 for *Candida parapsiposis*, 2 and 7 for *Candida tropicalis*).

The excitation wavelengths are chosen between 325 and 600 nm in steps of 1 nm and the emission wavelengths are chosen between 300 and 750 nm, in steps of 2 nm.

It is impossible to quickly and reliably differentiate the two reference strains of the example using their respective EEM matrices shown in FIG. 2. Indeed, no difference seems to emerge from such a representation.

The EEM matrices of the example are then analysed according to the method of the present invention.

Reference is now made to FIG. 4. Each line of the EEM matrices corresponds to an emission spectrum obtained for a given excitation wavelength. Thus, each line of EEM matrices can be projected onto a plane according to two main components calculated beforehand by an analysis of the main components.

FIG. 4 shows for each microorganism studied the projections of the emission spectra obtained for each excitation wavelength (numbered in the figure from 302 to 450 in steps of 2). The projections are carried out according to PC1 and P21, PC1 and PC3, PC1 and PC4, PC1 and PC5.

Such a representation can make it possible to differentiate the strains of *Candida parapsilosis* and *Candida tropicalis*. The identification is not as easy and quick as an identification using a projection of the vectors of the microorganism to be identified and reference microorganism in a plane according to PC1 and PC2.

Reference is now made to FIG. 5. FIG. 5 shows a projection obtained at the end of the method of the present invention.

The characteristic vectors of the four microorganisms studied of the present example are projected onto a plane according to PC1 and PC2 shown in FIG. 5.

The graph of FIG. 5 indeed makes it possible to differentiate and instantly identify the four reference microorganisms, *Pichia kudriavzevii* (formerly *Candida krusei*), *Candida parapsilosis*, and *Candida tropicalis*, *Candida Glabrata*.

Contrary to the illustrations discussed hereinabove, FIG. 5 makes it possible to separate the four microorganisms of different species into four distinct points in the same plane.

The points obtained for the two independent analyses conducted for the strain of *Candida parapsilosis*, as those obtained for the strain of *Candida tropicalis*, are very close, attesting to the reproducibility of the method.

Identifying such microorganisms is usually done using a MALDI-TOF spectrometer having several disadvantages. The present invention therefore makes it possible to quickly, easily and reliably identify microorganisms.

The invention claimed is:

1. A method for identifying a microorganism to be identified comprising the following steps:
   obtaining an Excitation-Emission matrix (EEM) of the microorganism to be identified,
   analysing the main components of said EEM matrix using at least one reference Excitation-Emission matrix (EEMr), where the analysing comprises:
   /i/ unfolding the EMM matrix of the microorganism to be identified after obtaining said EMM matrix into a single characteristic vector of the microorganism; and
   /ii/ analysing the main components of a data matrix, said data matrix comprising said vector obtained in the preceding step using at least one other vector (vr) coming from the unfolding of at least one EEMr matrix of a reference microorganism, the at least one EEMr matrix being obtained in the same conditions as the EEM matrix,
   projecting the result of the analysis onto a plane defined by two main components, and
   identifying the microorganism to be identified,
   where obtaining the EEM matrix of the microorganism to be identified is carried out with a fluorometer.

2. The method according to claim 1, wherein the EEM matrix is obtained for;
   a range of at least 2 excitation wavelengths between 140 and 2,000 nm, in steps from 0.1 to 20 nm, and
   a range of at least 10 emission wavelengths between 180 and 5,500 nm, in steps between 0.1 nm and 20 nm.

3. The method according to claim 1, where obtaining the EEM matrix to be identified is carried out directly on a culture medium on which the microorganism to be identified was cultivated beforehand.

4. The method according to claim 1, wherein the result of the analysis of the main components is projected onto a plane defined by two main components of a greater weight.

5. The method according to claim 1, wherein projecting the result of the analysis onto a plane defined by two main components further comprises displaying a list of distances between the projections of the microorganism and of the reference microorganism.

6. A non-transitory recording medium that can be read by a computer on which is recorded a program for the implementation of the method according to claim 1 when this program is executed by a processor.

7. The non-transitory recording medium that can be read by a computer according to claim 6, on which is recorded a panel of at least 100 reference microorganisms.

8. The method according to claim 1, wherein the EEM matrix is obtained for a range of at least 100 excitation wavelengths between 250 and 900 nm, in steps from 0.1 to 10 nm, and a range of at least 100 emission wavelengths between 200 and 900 nm, in steps between 1 and 10 nm.

9. The method according to claim 1, wherein the EEM matrix is obtained for a range of at least 500 excitation wavelengths between 250 and 900 nm, in steps of 0.8 nm, and a range of at least 500 emission wavelengths between 220 and 750 nm, in steps of 1 nm.

10. The method according to claim 1, where obtaining the EEM matrix to be identified is carried out directly on a semi solid culture medium on which the microorganism to be identified was cultivated beforehand.

* * * * *